United States Patent [19]

Engdahl et al.

[11] Patent Number: 5,037,463
[45] Date of Patent: Aug. 6, 1991

[54] FREEZE CONCENTRATION AND PRECIPITATE REMOVAL SYSTEM

[75] Inventors: Gerald E. Engdahl, Wheaton; James H. Richardson, Aurora, both of Ill.

[73] Assignee: Chicago Bridge & Iron Technical Services Company, Oak Brook, Ill.

[21] Appl. No.: 511,752

[22] Filed: Apr. 20, 1990

[51] Int. Cl.⁵ .................. B01D 9/04; C02F 1/22; D01D 9/00
[52] U.S. Cl. .................. 62/532; 62/541; 62/544; 62/123
[58] Field of Search .............. 62/123, 532, 537, 541, 62/544

[56] References Cited

U.S. PATENT DOCUMENTS

| | | | |
|---|---|---|---|
| Re. 25,940 | 12/1965 | Davids | 62/537 X |
| 3,049,889 | 8/1962 | Carfagno | 62/537 |
| 3,070,969 | 1/1963 | Ashley et al. | 62/58 |
| 3,250,081 | 5/1966 | Othmer | 62/537 |
| 3,314,881 | 4/1967 | Tuwiner | 62/123 X |
| 3,342,039 | 9/1967 | Bridge et al. | 62/123 |
| 3,477,241 | 11/1969 | Ashley | 62/124 |
| 3,501,924 | 3/1970 | Ashley | 62/123 |
| 3,620,034 | 11/1971 | Ganiaris | 62/58 |
| 3,664,145 | 5/1972 | Johnson | 62/58 |
| 3,681,932 | 8/1972 | Huber et al. | 62/123 |
| 3,779,030 | 12/1973 | Best | 62/532 |
| 4,091,635 | 5/1978 | Ogman | 62/123 |
| 4,286,436 | 9/1981 | Engdahl et al. | 62/123 |
| 4,314,455 | 2/1982 | Engdahl | 62/124 |
| 4,475,355 | 10/1984 | Thijssen et al. | 62/123 |
| 4,509,344 | 4/1985 | Ludwigsen | 62/123 X |
| 4,705,624 | 11/1987 | Thijssen | 62/532 X |
| 4,750,333 | 6/1988 | Husain et al. | 62/118 |
| 4,762,622 | 8/1988 | Thijssen | 62/532 X |
| 4,830,645 | 5/1989 | Ghodsizadeh et al. | 62/541 |
| 4,912,935 | 4/1990 | Goldstein | 62/123 |
| 4,936,114 | 6/1990 | Engdahl et al. | 62/123 X |

Primary Examiner—Henry A. Bennet
Assistant Examiner—C. B. Kilner
Attorney, Agent, or Firm—Marshall, O'Toole, Gerstein, Murray & Bicknell

[57] ABSTRACT

A method of removing contaminants from an aqueous waste stream comprising feeding a contaminated aqueous liquid to the lower internal space of a feed tank and cooling the liquid in the tank to a temperature which results in precipitation of at least part of the contaminants; withdrawing the precipitated contaminants from the feed tank lower internal space; withdrawing aqueous liquid from the feed tank upper internal space and delivering it to a freezer; cooling the aqueous liquid in the freezer to convert at least part of the liquid to ice to produce an aqueous ice slurry; feeding aqueous ice slurry from the freezer to an aqueous ice slurry receiver; withdrawing aqueous ice slurry from the aqueous ice slurry receiver and recycling some of it to the freezer and some of it to the lower internal space of the feed tank; withdrawing aqueous ice slurry from the aqueous ice slurry receiver and delivering it to a central space of a separator-precipitate vessel; withdrawing aqueous ice slurry from the central space of the separator-precipitate vessel and delivering it to a lower internal space of an ice washer vessel; withdrawing precipitated contaminants from the lower internal space of the separator-precipitate vessel; washing the ice in the washer vessel and removing the washed ice therefrom; and withdrawing cold ice wash water from the washer vessel.

The details of the apparatus used in the method are also disclosed.

34 Claims, 1 Drawing Sheet

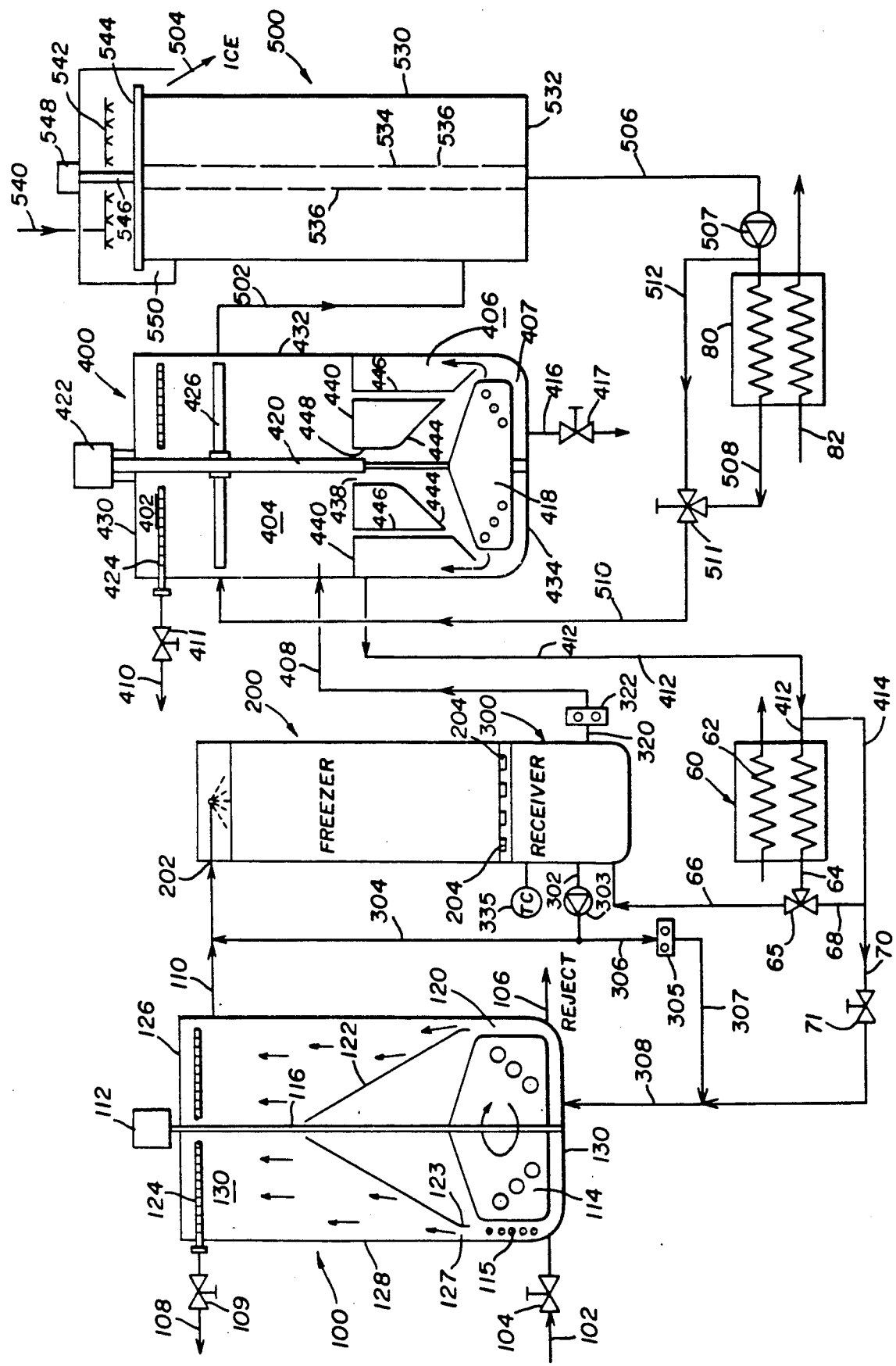

FREEZE CONCENTRATION AND PRECIPITATE REMOVAL SYSTEM

This invention relates to apparatus for, and methods of, separating contaminants from aqueous mixtures. More particularly, this invention is concerned with concentrating aqueous contaminated waste streams by freeze concentration so that the water can be readily discarded and the separated contaminates disposed of safely.

BACKGROUND OF THE INVENTION

Various freeze processes have been developed to separate water from brackish water as well as contaminated aqueous waste streams containing dissolved or suspended salts. See, for example, the U.S. Pat. Nos. of Ashley et al 3,070,969; 3,477,241; 3,501,924; Ganiaris 3,620,034; Johnson 3,664,145 and Ogman 4,091,635.

More recent freeze processes employ a vertical shell and tube freeze exchanger in which an ice slurry is formed. The ice slurry is discharged from the bottom of the freeze exchanger into an ice slurry receiver-crystallizer. The ice slurry is subsequently sent to an ice separator-washer Such apparatus is disclosed in the U.S Pat. Nos. of Engdahl 4,314,455 and Husain et al 4,750,333.

The described apparatus is suitable for freeze concentrating waste water streams having a relatively low concentration of precipitable salts. It is inherent in the freeze concentration process that as the amount of ice formed increases that the concentration of salts in the solution increases, thereby causing them to precipitate. Even though such precipitates carry over with the ice to the washer-separator they can be handled satisfactorily up to a reasonable amount. However, high strength waste water, i.e. waste water that contains a considerable fraction of precipitable salt, is not readily processed in such apparatus because the precipitable salts carry over into the ice separating, washing and melting stage. This adversely affects the product water quality because the precipitable salts that are carried over with the ice into the washing stage and into the melter redissolve into the product water, thereby increasing the salt content of the product water. It is crucial to obtaining product water of acceptable purity for discharge to the environment that the precipitable salts be separated. A need accordingly exists for apparatus and methods for concentrating waste streams having a substantial concentration of contaminants.

SUMMARY OF THE INVENTION

According to the invention apparatus is provided comprising a feed tank having upper and lower internal spaces; a feed stream inlet conduit for feeding a warm stream of contaminated aqueous liquid to the feed tank lower internal space; a reject outlet communicating with the feed tank lower internal space for withdrawing precipitated contaminants; a freezer for producing ice having an inlet and an outlet; conduit means for feeding aqueous liquid from the feed tank upper internal space to the freezer inlet; an ice slurry receiver; means for feeding aqueous ice slurry from the freezer outlet to the ice slurry receiver; conduit means for withdrawing aqueous ice slurry from the ice slurry receiver and delivering it to the freezer inlet; conduit means for withdrawing aqueous ice slurry from the ice slurry receiver and delivering it to the lower internal space of the feed tank; a separator-precipitate vessel having an upper space, a central space, a clarifier space below the central space, and a lower space therein; conduit means for withdrawing aqueous ice slurry from the receiver and delivering it to the separator-precipitate vessel central space; conduit means communicating with the separator-precipitate vessel upper space for removing low specific gravity fluids; conduit means communicating with the separator-precipitate vessel clarifier space for withdrawing aqueous solution therefrom; a reject outlet communicating with the separator-precipitate vessel lower internal space for withdrawing precipitated contaminants; an ice washer vessel; conduit means for withdrawing aqueous ice slurry from the separator-precipitate vessel upper space and delivering it to a lower internal space of the ice washer vessel; means to remove washed ice from the ice washer vessel; and conduit means communicating with the ice washer vessel for withdrawing solution therefrom and delivering it to the separator-precipitate vessel upper internal space.

The described apparatus is intended to provide suitable conditions for promoting precipitate crystal growth and to provide for the removal of the precipitate crystals from the system.

More particularly, the invention provides apparatus comprising a feed tank having upper and lower internal spaces; a feed stream inlet conduit for feeding a warm stream of contaminated aqueous liquid to the feed tank lower internal space; a reject outlet communicating with the feed tank lower internal space for withdrawing precipitated contaminants; a freezer for producing ice having an inlet and an outlet; conduit means for feeding aqueous liquid from the feed tank upper internal space to the freezer inlet; an ice slurry receiver; means for feeding aqueous ice slurry from the freezer outlet to the ice slurry receiver; conduit means for withdrawing aqueous ice slurry from the ice slurry receiver and delivering it to the freezer inlet; conduit means for withdrawing aqueous ice slurry from the ice slurry receiver and delivering it to the lower internal space of the feed tank; a separator-precipitate vessel having an upper space, a central space, a clarifier space below the central space, and a lower space therein; conduit means for withdrawing aqueous ice slurry from the receiver and delivering it to the separator-precipitate vessel central space; conduit means communicating with the separator-precipitate vessel upper space for removing low specific gravity fluids; a first heat exchanger; means to pass a warm fluid through the first heat exchanger; conduit means communicating with the separator-precipitate vessel clarifier space for withdrawing aqueous solution therefrom and delivering it to the first heat exchanger; conduit means for withdrawing warmer fluid from the first heat exchanger and feeding it to the ice slurry receiver; conduit means for withdrawing warmer fluid from the first heat exchanger and feeding it to the feed tank; conduit means communicating with the separator-precipitate vessel clarifier space for withdrawing solution therefrom and delivering it to the ice slurry receiver; conduit means communicating with the separator-precipitate vessel clarifier space for withdrawing aqueous solution therefrom and delivering it to the feed tank; a reject outlet communicating with the separator-precipitate vessel lower internal space for withdrawing precipitated contaminants; an ice washer vessel; conduit means for withdrawing aqueous ice slurry from the separator-precipitate vessel upper space and delivering it to a lower internal space of the ice washer vessel; means to remove washed ice from the ice washer vessel; a second heat exchanger; means to pass a warm fluid through the second heat exchanger; conduit means communicating with the ice washer vessel for withdrawing solution therefrom and delivering it to the second heat exchanger; and conduit means for withdrawing warmer solution from the second heat exchanger and feeding it to the separator-precipitate vessel upper internal space.

More specifically, the feed tank, which can be enclosed by a top, side wall and bottom, can have upper and lower internal spaces; a feed stream inlet conduit for feeding a warm stream of contaminated aqueous liquid to the feed tank lower internal space; a reject outlet communicating with the feed tank lower internal space for withdrawing precipitated contaminants; conduit means for withdrawing aqueous liquid from the feed tank upper internal space; a rotatable paddle in the lower internal space of the feed tank; the paddle being mounted on a vertical shaft; a drive means external of the feed tank operably connected to the shaft to axially drive the shaft; an internal conical shell axially positioned relative to the shaft; the conical shell having at least an opening in the top for the shaft and an open bottom with the shell wider at the bottom than at the top; and the conical shell terminating with a bottom end spaced inwardly of the vessel side wall to provide an annular pathway for upward flow of liquid.

A pipe for removing low specific gravity fluid contaminants can be positioned in the feed tank upper internal space in communication with the outlet conduit.

The feed tank can also have a conduit means communicating with the tank lower internal space for delivering an aqueous solution thereto.

More specifically, the separator-precipitate vessel can be enclosed and have a top, side wall and bottom; an upper internal space in which low specific gravity fluids can accumulate; conduit means communicating with the vessel upper internal space for removing low specific gravity fluids from the vessel; a central internal space for receiving aqueous ice slurry; conduit means for feeding aqueous ice slurry to the central internal space; conduit means for withdrawing aqueous ice slurry from the vessel upper space above the space to which aqueous ice slurry is fed into the vessel; conduit means for feeding solution to the vessel upper internal space above the space to which aqueous ice slurry is fed into the vessel; a lower internal space in the vessel; a reject outlet communicating with the vessel lower internal space for withdrawing precipitated contaminants; a horizontal plate extending across the vessel internal area and joined to the vessel side wall and having a central hole; a substantially truncated conical shell having an open upper end and means connecting the upper end to the horizontal plate around the hole; the conical shell terminating in a lower edge spaced inward of the vessel side wall; a plurality of conduits extending through both the horizontal plate and the conical shell through which liquid can flow from the central space to the lower space; the space defined by the horizontal plate, the conical shell and the vessel side wall constituting a clarifier space; conduit means communicating with the vessel clarifier space for withdrawing aqueous solution therefrom; a rotatable paddle beneath the conical shell; the paddle being mounted on a vertical shaft; the shaft having radial fingers mounted thereon and positioned in the upper space of the vessel; and a drive means external of the vessel operably connected to the shaft to axially drive the shaft.

A pipe can be positioned in the upper internal space of the separator-precipitate vessel in communication with the conduit means for removing low specific gravity fluid contaminants.

The upper end of the conical shell in the separator-precipitate vessel can be connected to the horizontal plate around the hole in the plate by a cylindrical tube.

The invention also provides a method comprising feeding a contaminated aqueous liquid to the lower internal space of a feed tank and cooling the liquid in the tank to a temperature which results in precipitation of at least part of the contaminants; withdrawing the precipitated contaminants from the feed tank lower internal space; withdrawing aqueous liquid from the feed tank upper internal space and delivering it to a freezer; cooling the aqueous liquid in the freezer to convert at least part of the liquid to ice to produce an aqueous ice slurry; feeding aqueous ice slurry from the freezer to an aqueous ice slurry receiver; withdrawing aqueous ice slurry from the aqueous ice slurry receiver and recycling some of it to the freezer and some of it to the lower internal space of the feed tank; withdrawing aqueous ice slurry from the aqueous ice slurry receiver and delivering it to a central space of a separator-precipitate vessel; withdrawing aqueous ice slurry from the upper space of the separator-precipitate vessel and delivering it to a lower internal space of an ice washer vessel; withdrawing precipitated contaminants from the lower internal space of the separator-precipitate vessel; washing the ice in the washer vessel and removing the washed ice therefrom; and withdrawing cold solution from the washer vessel.

Cold aqueous solution can be withdrawn from a clarifier space in the separator-precipitate vessel, the solution warmed and then delivered to the ice slurry receiver. Also, part of the warmed solution can be fed to the feed tank.

Liquid solution can also be withdrawn from the separator-precipitate vessel clarifier space and then be delivered to the feed tank. The solution can be warmed before it is delivered to the feed tank.

Cold solution can be withdrawn from the washer vessel, warmed and then fed to the upper internal space of the separator-precipitate vessel.

When appropriate low specific gravity fluid contaminants can be removed from the upper internal space of the feed tank and/or from the separator-precipitate vessel.

The liquid contents in the lower internal space of the feed tank and/or the liquid contents in the lower internal space of the separator-precipitate vessel can be mechanically stirred to obtain temperature control, facilitate precipitate crystal growth and precipitate formation.

BRIEF DESCRIPTION OF THE DRAWINGS

The attached drawing constitutes, in part, a schematic representation of an over-all apparatus useful in practicing the invention as well as specific structural features highly suitable for obtaining effective results.

DETAILED DESCRIPTION OF THE DRAWINGS

The enclosed feed tank 100 has a top 126, circular cylindrical side wall 128 and bottom 130. Conduit 102 containing control valve 104 communicates with the lower internal space of the feed tank 100. The feed tank 100 also has an upper internal space 130. Beneath the tank top 126 there is positioned a horizontal pipe 124 containing a plurality of holes or orifices through which fluids can flow. Pipe 124 communicates with outlet conduit 108 containing control valve 109.

A conical shell 122 constituting a baffle is positioned in feed tank 100 axially relative to vertical drive shaft 116. The conical shell 122 has an open top or hole slightly larger than the diameter of the shaft which passes through the hole. The conical shell 122 is wider at the bottom than at the top so that the apex is pointed upwardly.

A rotatable stirring paddle 114 is fixedly mounted on the lower end of drive shaft 116, thereby positioning the paddle in the lower internal space 120 of feed tank 100. Drive motor 112 is mounted outside of feed tank 100 and is interconnected to turn drive shaft 116. Optional coils 115 can be positioned along the side wall 128 adjacent but beyond the peripheral path of paddle 114. The coils 115 can have a fluid circulated therein to heat or cool liquid in the feed tank.

A contaminated aqueous feed stream, which can be warm, containing dissolved solids and optionally containing low specific gravity fluids, is fed by conduit 102 through control valve 104 into the lower internal space 120 of feed tank 100. The liquid is cooled in tank 100, such as by the cooling coil or an ice slurry supplied by means of conduit 308. Solids precipitate from the solution being stirred by paddle 114 in the lower internal space (120) and are removed by reject conduit 106. The solution flows upwardly through the annular space 127. As the flow path widens above conical shell 122 thereby providing a more quiescent zone, precipitate settles out and descends along the conical shell to return into the lower internal space 120. Any fluids of low specific gravity are released and accumulate in the space below top 126. These fluids are removed periodically through pipe 124 and outlet conduit 108. The liquid solution is withdrawn from feed tank 100 by conduit 110 and fed to the inlet 202 of freezer 200.

Freezer 200 can be a special shell and tube freeze exchanger in which the aqueous solution flowing downwardly on the inside surface of the tubes 204 is indirectly cooled to a low temperature by a refrigerant on the shell side of the freeze exchanger. Suitable freeze exchangers of the described type are disclosed in the prior art as for example in Engdahl et al U.S. Pat. Nos. 4,286,436, 4,314,455 and Husain et al 4,750,333. As the solution flows down the inside surface of the tubes it is cooled sufficiently to cause ice crystals to form thereby yielding an ice slurry which flows out of the lower end of the tubes and is delivered to an ice slurry receiver 300.

Some of the ice slurry can be withdrawn from receiver 300 by means of conduit 302 and fed to pump 303. Then part of the ice slurry can be fed from pump 303 to conduit 304 and then to conduit 110 to be delivered to the inlet 202 of freezer 200 to cool the solution and provide ice crystal seeds which can grow in size. A part of the ice slurry withdrawn by conduit 302 from receiver 300 can be fed from pump 303 to conduit 306 and by it to pump 305 and then to conduit 307 which feeds the ice slurry to conduit 308 which delivers it to the lower internal space of feed tank 100.

Ice slurry is also withdrawn from receiver 300 by conduit 320 and fed to pump 322 which pumps it to conduit 408 which delivers it to the central internal space of separator-precipitate vessel 400.

Separator-precipitate vessel 400 has a top 430, a circular cylindrical side wall 432 and a bottom 434 which taken together form a fully enclosed vessel. The vessel 400 has an internal upper space 402, an internal central space 404, an internal clarifier space 406 and an internal lower space 407. The vessel 400 provides for the separation of the ice from the brine in the central internal space 404. It also provides for precipitate crystal growth in the internal space 407 and accumulation in, and removal of the precipitate from, the internal lower space 407.

Pipe 424 containing a plurality of holes or orifices is positioned in the upper internal space 402 in communication with conduit 410 containing control valve 411 for removing low specific gravity fluid contaminants which may accumulate in that space.

Circular horizontal plate 440 extends across the vessel 400 internal area and is joined to the vessel side wall 432. Plate 440 has a small central hole 438 through which rotatable shaft 420 extends. A substantially truncated conical shell 444 having an open upper end is connected to the plate 440 around hole 438 by means of cylindrical shell 448. The conical shell 444 terminates in a lower edge spaced inward of the vessel side wall 432. A plurality of conduits, which may be spaced apart vertical tubes, extend through both the horizontal plate 440 and the conical shell 444. The space defined by the horizontal plate 440, the conical shell 444, cylindrical shell 448 and the vessel 400 side wall 432 constitutes a clarifier space 406.

A rotatable vertical stirring paddle 418 carried by the lower end of vertical shaft 420 is located beneath conical shell 444. Shaft 420 also carries horizontal radial fingers or bars 426 positioned in the upper space 404 of the vessel 400. Motor 422, located external of the vessel, is operably connected to the shaft 420 to drive the shaft at a suitable speed to stir the liquid contents in the vessel.

Reject outlet or conduit 416 containing control valve 417 communicates with the vessel 400 lower internal space 407 and is used to withdraw precipitated contaminants.

Withdrawal conduit 412 communicates with the upper portion of clarifier space 406 and is used to withdraw cold liquid for recycling as will be subsequently explained.

Inlet conduit 510 is used to feed warmed or cold solution to the upper internal space 402 of vessel 400, above the space to which aqueous ice slurry is fed into the vessel by conduit 408.

Aqueous ice slurry is withdrawn by conduit 502 from the upper space 402 of vessel 400.

The ice slurry supplied by conduit 408 enters the central internal space 404 of vessel 400 above horizontal plate 440. The separator/precipitate vessel 400 provides for the separation of the ice from the liquid or brine and a lower precipitate volume for precipitate crystal growth and removal. Because aqueous solutions are concentrated in a freeze concentration system by removing water, the remaining brine may form precipitates. It is desirable to remove these precipitates from the system. Removing precipitates from the system increases the concentration ratio of the system. In some applications the reject precipitate stream may have value as a usable product.

The ice slurry is displaced upwardly and is stirred by rotating fingers 426. It is desirable to maintain the temperature of the ice slurry liquid content in the area around the fingers 426 warmer than elsewhere in the vessel so as to prevent precipitation of contaminants from the liquid. Thus, the temperature can be 25° F. above the fingers 426 and 20° F. below the fingers. This promotes larger ice crystal formation and a lesser salt or contaminant concentration above the fingers.

While the ice rises gently in the internal central space 404 there is a downward flow of liquid through tubes 446 into the lower space 407. Precipitates form in space 407 and descend to the bottom of the vessel from which they are removed by conduit 416. Cold liquid flows upwards through the annular space between vessel side wall 432 and the lower edge of conical shell 444 into the clarifier section 406 and is withdrawn by outlet conduit 412.

The cold clarified liquid can be fed from conduit 412 to conduits 414, 70 through control valve 71 to conduit 308 for delivery to the lower internal space 120 of feed tank 100 to increase the concentration of the solution in vessel 100. Alternatively, the cold liquid can be fed by conduit 412 through first heat exchanger 60 and be indirectly warmed by heat transfer with a warm fluid fed through conduit 62 in the heat exchanger. By warming the liquid the precipitate fines are dissolved. The system is designed to form, grow and remove precipitates in the lower portion of the precipitate vessels. The melting of the fines helps prevent the formation of precipitates in other parts of the system. It is important to prevent a major carryover of precipitates to the washer vessel 500 where they could increase total dissolved solids in the melted ice water to unacceptable levels and cause severe operation upsets in vessel 500. The warmed liquid is fed from heat exchanger 60 to conduit 64 and then through three way control valve 65 to control the temperature in conduit 66. Temperature regulator 335 controls the freezer refrigeration.

The aqueous ice slurry withdrawn from separator-clarifier 400 by means of conduit 502 is fed to the lower portion of washer vessel or column 500 which can be of known construction. Engdahl U.S. Pat. No. 4,314,455 discloses a washer vessel of the type to be briefly described subsequently herein. Washer vessel 500 has a cylindrical circular vertical side wall 530 and a bottom 532. Vertical tube 534 is axially located in the vessel. Tube 534 is provided with a plurality of holes 536. As the ice slurry is fed to vessel 500 by conduit 502 the ice moves upwardly by gravity and forms an ice pack or bed in the upper portion of the vessel. The cold solution flows through holes 536 into the interior of tube 534 from which it is withdrawn by conduit 506.

Wash water is supplied by conduit 540 to spray header 542 from which water is sprayed onto the ice pack. Scraper blade 544 mounted on shaft 546 driven by motor 548 scrapes off washed ice from the top of the ice pack. The ice collects in trough 550 and can be removed therefrom through outlet 504.

The cold solution can be fed by conduit 506 to pump 507 and from the pump to conduit 512, then through three way temperature control valve 511 to conduit 510 for delivery to the central internal space 404 in vessel 500. Alternatively, the cold solution can be fed from pump 507 through second heat exchanger 80 where it is warmed indirectly by a heated fluid fed through the conduit 82. The heated liquid exits the second heat exchanger 80 into conduit 508 which feeds it to three-way valve 511 from which it is directed to conduit 510 for delivery to the internal space 402 of vessel 400. In this way the temperature of the liquid in the space 402 can be regulated for optimum ice crystal growth which allows higher production rates by washer vessel 500, and reduction of wash water freeze-up problems Increased temperatures will reduce precipitate formation in the washer vessel.

The apparatus and method provided by this invention is useful for precipitating salts from many different highly concentrated waste waters. It is especially useful in treating waste water from the Stretford Process. Such waste water contains up to 10% dissolved solids, most of which is sodium sulfate and sodium thiosulfate. Sodium sulfate quickly precipitates when the waste water is cooled in the feed vessel to a temperature 5° F. above the freezing temperature, thereby yielding a saturated aqueous solution which can be fed to a freeze exchanger to form an ice slurry which can be delivered to the separator/precipitate vessel and to a washer vessel to separate the ice content.

The foregoing detailed description has been given for clearness of understanding only, and no unnecessary limitations should be understood therefrom, as modifications will be obvious to those skilled in the art.

What is claimed is:

1. Apparatus comprising:
   a feed tank (100) having upper (130) and lower (120) internal spaces;
   a feed stream inlet conduit (102) for feeding a stream of contaminated aqueous liquid to the feed tank lower internal space (120);
   a reject outlet (106) communicating with the feed tank lower internal space (120) for withdrawing precipitated contaminants;
   a freezer (200) for producing ice having an inlet (202) and an outlet (204);
   conduit means (110) for feeding aqueous liquid from the feed tank (100) upper internal space (130) to the freezer inlet;
   an ice slurry receiver (300);
   means (204) for feeding aqueous ice slurry from the freezer outlet to the ice slurry receiver (300);
   conduit means (302, 304) for withdrawing aqueous ice slurry from the ice slurry receiver (300) and delivering it to the freezer inlet (202);
   conduit means (306, 308) for withdrawing aqueous ice slurry from the ice slurry receiver (300) and delivering it to the lower internal space (120) of the feed tank (100);
   a separator-precipitate vessel (400) having an upper space (402), a central space (404), a clarifier space (406) below the central space (404), and a lower space (407) therein;
   conduit means (408) for withdrawing aqueous ice slurry from the receiver and delivering it to the separator-precipitate vessel central space (404);
   conduit means (412, 414, 68, 66) communicating with the separator-precipitate vessel (400) clarifier space (406) for withdrawing aqueous solution therefrom;
   a reject outlet (416) communicating with the separator-precipitate vessel (400) lower internal space (407) for withdrawing precipitated contaminants;
   an ice washer vessel (500);
   conduit means (502) for withdrawing aqueous ice slurry from the separator-precipitate vessel (400) upper space (402) and delivering it to a lower internal space of the ice washer vessel (500);

means (504) to remove washed ice from the ice washer vessel (500); and conduit means (506, 512, 510) communicating with the ice washer vessel (500) for withdrawing solution therefrom and delivering it to the separator-precipitate vessel (400) upper internal space (402).

2. Apparatus according to claim 1 including conduit means (410) communicating with the separator-precipitate vessel (400) upper space (402) for removing low specific gravity fluids.

3. Apparatus according to claim 1 including an outlet conduit (108) communicating with the feed tank upper internal space (130) for removing low specific gravity contaminants.

4. Apparatus according to claim 1 in which:
the feed tank (100) has a rotatable paddle (114) in the lower internal space (120);
the paddle is mounted on a vertical shaft (116); and
a drive means (112) external of the feed tank is operably connected to the shaft (116) to axially drive the shaft.

5. Apparatus according to claim 1 in which:
a pipe (124) for removing low specific gravity fluid contaminants is positioned in the feed tank upper internal space (130) in communication with the outlet conduit (108).

6. Apparatus according to claim 1 in which:
the feed tank is circular in horizontal section;
the feed tank has an internal conical shell (122) axially positioned relative to the shaft; and
the conical shell (122) has an open top and bottom and the shell is wider at the bottom than the top.

7. Apparatus according to claim 1 in which:
the separator-precipitate vessel (400) is circular in horizontal section;
the separator-precipitate vessel (400) has a rotatable paddle (418) in the lower internal space (407);
the paddle (418) is mounted on a vertical shaft (420); and
a drive means (422) external of the separator-precipitate vessel (400) is operably connected to the shaft (420) to axially drive the shaft.

8. Apparatus according to claim 6 in which:
the shaft has radial paddle fingers (426) mounted thereon and positioned in the upper space (402) of the vessel (400).

9. Apparatus according to claim 6 in which:
a pipe (424) is positioned in the upper internal space (402) of the separator-precipitate vessel (400) in communication with the conduit means (410) for removing low specific gravity fluid contaminants.

10. Apparatus comprising:
a feed tank (100) having upper (130) and lower (120) internal spaces;
a feed stream inlet conduit (102) for feeding a stream of contaminated aqueous liquid to the feed tank lower internal space (120);
a reject outlet (106) communicating with the feed tank lower internal space (120) for withdrawing precipitated contaminants;
a freezer (200) for producing ice having an inlet (202) and an outlet (204);
conduit means (110) for feeding aqueous liquid from the feed tank (100) upper internal space (130) to the freezer inlet;
an ice slurry receiver (300);
means (206) for feeding aqueous ice slurry from the freezer outlet to the ice slurry receiver (300);
conduit means (302, 304) for withdrawing aqueous ice slurry from the ice slurry receiver (300) and delivering it to the freezer inlet (202);
conduit means (306, 308) for withdrawing aqueous ice slurry from the ice slurry receiver (300) and delivering it to the lower internal space (120) of the feed tank (100);
a separator-precipitate vessel (400) having an upper space (402), a central space (404), a clarifier space (406) below the central space (404), and a lower space (407) therein;
conduit means (408) for withdrawing aqueous ice slurry from the receiver and delivering it to the separator-precipitate vessel central space (404);
a first heat exchanger (60);
means (62) to pass a warm fluid through the first heat exchanger (60);
conduit means (412) communicating with the separator-precipitate vessel (400) clarifier space (406) for withdrawing aqueous solution therefrom and delivering it to the first heat exchanger (60);
conduit means (64, 66) for withdrawing warmer solution from the first heat exchanger (60) and feeding it to the ice slurry receiver (300);
conduit means (412, 414, 68, 66) communicating with the separator-precipitate vessel (400) clarifier space (406) for withdrawing aqueous solution therefrom and delivering it to the ice slurry receiver (300);
conduit means (412, 414, 70, 308) communicating with the separator-precipitate vessel (400) clarifier space (406) for withdrawing aqueous solution therefrom and delivering it to the feed tank (100);
a reject outlet (416) communicating with the separator-precipitate vessel (400) lower internal space (407) for withdrawing precipitated contaminants;
an ice washer vessel (500);
conduit means (502) for withdrawing aqueous ice slurry from the separator-precipitate vessel (400) upper space (402) and delivering it to a lower internal space of the ice washer vessel (500);
means (504) to remove washed ice from the ice washer vessel (500);
a second heat exchanger (80);
means (82) to pass a warm fluid through the second heat exchanger (80);
conduit means (506) communicating with the ice washer vessel (500) for withdrawing cold solution therefrom and delivering it to the second heat exchanger (80);
conduit means (508, 510) for withdrawing warmer solution from the second heat exchanger (80) and feeding it to the separator-precipitate vessel (400) upper internal space (402); and
conduit means (506, 512, 510) communicating with the ice washer vessel (500) for withdrawing cold solution therefrom and delivering it to the separator-precipitate vessel (400) upper internal space (402).

11. Apparatus according to claim 10 including conduit means (410) communicating with the separator-precipitate vessel (400) upper space (402) for removing low specific gravity fluids 12. Apparatus according to claim 10 including an outlet conduit (108) communicating with the feed tank upper internal space (130) for removing low specific gravity contaminants.

13. Apparatus according to claim 10 in which:

the feed tank (100) has a rotatable paddle (114) in the lower internal space (120);

the paddle is mounted on a vertical shaft (116); and a drive means (112) external of the feed tank is operably connected to the shaft (116) to axially drive the shaft.

14. Apparatus according to claim 10 in which:

a pipe (124) for removing low specific gravity fluid contaminants is positioned in the feed tank upper internal space (130) in communication with the outlet conduit (108).

15. Apparatus according to claim 10 in which:

the feed tank is circular in horizontal section;

the feed tank has an internal conical shell (122) axially positioned relative to the shaft; and the conical shell (122) has an open top and bottom and the shell is wider at the bottom than the top.

16. Apparatus according to claim 10 in which:

the separator-precipitate vessel (400) is circular in horizontal section;

the separator-precipitate vessel (400) has a rotatable paddle (418) in the lower internal space (407);

the paddle (418) is mounted on a vertical shaft (420); and a drive means (422) external of the separator-precipitate vessel (400) is operably connected to the shaft (420) to axially drive the shaft.

17. Apparatus according to claim 15 in which:

the shaft has radial paddle fingers (426) mounted thereon and positioned in the upper space (402) of the vessel (400).

18. Apparatus according to claim 15 in which:

a pipe (424) is positioned in the upper internal space (402) of the separator-precipitate vessel (400) in communication with the conduit means (410) for removing low specific gravity fluid contaminants.

19. An enclosed separator-precipitate vessel (400) for separating precipitates from an ice slurry, having:

a top (430), side wall (132) and bottom (434):

an upper internal space (402) in which low specific gravity fluids can accumulate;

conduit means (410) communicating with the vessel upper internal space (402) for removing low specific gravity fluids from the vessel;

a central internal space (404) for receiving a cold mixture of aqueous ice slurry;

conduit means (408) for feeding aqueous ice slurry to the central internal space (404);

conduit means (502) for withdrawing aqueous ice slurry from the vessel (400) upper space (402);

conduit means (506, 508, 510) for feeding a warmer solution to the vessel (400) upper internal space (402);

a lower internal space (407) in the vessel (400);

a reject outlet (416) communicating with the vessel (400) lower internal space (407) for withdrawing precipitated contaminants;

a horizontal plate (440) extending across the vessel internal area and joined to the vessel side wall (432) and having a central hole (438);

a substantially truncated conical shell (444) having an open upper end and means connecting the upper end to the horizontal plate (440) around the hole (438);

the conical shell (444) terminating in a lower edge spaced inward of the vessel side wall;

a plurality of conduits (446) extending through both the horizontal plate (440) and the conical shell (444) through which liquid can flow from the central space (404) to the lower space (407);

the space defined by the horizontal plate (440), the conical shell (444) and the vessel (400) side wall (432) constituting a clarifier space (406);

conduit means (412) communicating with the vessel (400) clarifier space (406) for withdrawing aqueous solution therefrom;

a rotatable paddle (418) beneath the conical shell;

the paddle (418) being mounted on a vertical shaft (420);

the shaft having radial paddle fingers (426) mounted thereon and positioned in the upper space (402) of the vessel (400); and a drive means (422) external of the vessel (400) operably connected to the shaft (420) to axially drive the shaft.

20. Apparatus according to claim 19 in which:

a pipe (424) is positioned in the upper internal space (402) of the vessel (400) in communication with the conduit means (410) for removing low specific gravity fluid contaminants.

21. Apparatus according to claim 19 in which the means connecting the conical shell upper end to the horizontal plate around the hole (438) comprises a cylindrical shell.

22. An enclosed feed tank in which a liquid feed stream can be cooled to precipitate contaminants, having:

a top (126), side wall (128) and bottom (130);

the feed tank (100) having upper (130) and lower (120) internal spaces;

a feed stream inlet conduit (102) for feeding a stream of contaminated aqueous liquid to the feed tank lower internal space (120);

a reject outlet (106) communicating with the feed tank lower internal space (120) for withdrawing precipitated contaminants;

conduit means (110) for withdrawing aqueous liquid from the feed tank (100) upper internal space (130);

a rotatable paddle (114) in the lower internal space (120) of the feed tank (100);

the paddle being mounted on a vertical shaft (116);

a drive means (112) external of the feed tank operably connected to the shaft (116) to axially drive the shaft;

the feed tank having an internal conical shell (122) coxially positioned relative to the shaft (116);

the conical shell (122) having an open top and bottom and with the shell wider at the bottom than at the top; and the conical shell terminating with a bottom end (123) spaced inwardly of the vessel side wall (128) thereby providing a pathway (127) for upward flow of liquid.

23. A feed tank according to claim 22 in which the feed tank (100) is circular in horizontal section.

24. A feed tank according to claim 22 in which:

a pipe (124) for removing low specific gravity fluid contaminants is positioned in the feed tank (100) upper internal space (130) in communication with the outlet conduit (108).

25. A feed tank according to claim 22 in which:

conduit means (308) communicates with the feed tank (100) lower internal space (120) for delivering an aqueous solution thereto.

26. A method comprising:

feeding a contaminated aqueous liquid to the lower internal space (120) of a feed tank (100) and cooling the liquid in the tank to a temperature which results in precipitation of at least part of the contaminants;

withdrawing the precipitated contaminants from the feed tank lower internal space (120);

withdrawing aqueous liquid from the feed tank (100) upper internal space (130) and delivering it to a freezer (200);

cooling the aqueous liquid in the freezer to convert at least part of the liquid to ice to produce an aqueous ice slurry;

feeding aqueous ice slurry from the freezer to an aqueous ice slurry receiver (300);

withdrawing aqueous ice slurry from the aqueous ice slurry receiver (300) and recycling some of it to the freezer (202) and some of it to the lower internal space (120) of the feed tank (100);

withdrawing aqueous ice slurry from the aqueous ice slurry receiver (300) and delivering it to a central space (404) of a separator-precipitate vessel (400);

withdrawing aqueous ice slurry from the upper space of the separator-precipitate vessel (400) and delivering it to a lower internal space of an ice washer vessel (500);

withdrawing precipitated contaminants from the lower internal space (407) of the separator-precipitate vessel (400);

washing the ice in the washer vessel and removing the washed ice therefrom; and withdrawing cold solution from the washer vessel (500).

27. A method according to claim 26 including:

withdrawing cold aqueous solution from a clarifier space (406) in the separatorprecipitate vessel (400), warming the solution and delivering it to the ice slurry receiver (300).

28. A method according to claim 27 including:

withdrawing solution from the separator-precipitate vessel (400) clarifier space (406) and delivering it to the feed tank (100).

29. A method according to claim 26 including:

heating cold solution withdrawn from the washer vessel (500) and feeding the resulting solution to the upper internal space (402) of the separator-precipitate vessel (400).

30. A method according to claim 26 including:

delivering the cold solution withdrawn from the washer vessel (500) to the upper internal space (402) of the separator-precipitate vessel (400).

31. A method according to claim 26 including:

removing low specific gravity fluid contaminants from an upper internal space (130) of the feed tank (100).

32. A method according to claim 26 including:

removing low specific gravity contaminants from an upper internal space (402) of the separator-precipitate vessel (400).

33. A method according to claim 26 including:

mechanically stirring the liquid contents in the lower internal space (120) of the feed tank (100).

34. A method according to claim 26 including:

mechanically stirring the liquid contents in the lower internal space (407) of the separator-precipitate vessel (400).

* * * * *

UNITED STATES PATENT AND TRADEMARK OFFICE
CERTIFICATE OF CORRECTION

PATENT NO. : 5,037,463
DATED     : AUGUST 6, 1991
INVENTOR(S) : GERALD E. ENGDAHL ET AL

It is certified that error appears in the above-identified patent and that said Letters Patent is hereby corrected as shown below:

Column 1, line 25, place a period (.) after "washer";

column 4, lines 57 and 65, change "DRAWINGS" to -- DRAWING --;

column 8, line 6, after "problems" insert a period (.);

column 11, line 39, change "(132)" to -- (432) --.

Signed and Sealed this

Seventeenth Day of November, 1992

Attest:

DOUGLAS B. COMER

Attesting Officer

Acting Commissioner of Patents and Trademarks